United States Patent
Perkins

(10) Patent No.: US 10,232,732 B2
(45) Date of Patent: Mar. 19, 2019

(54) SYSTEM AND METHOD FOR BATTERY CONTROL USING RMS CURRENT

(71) Applicant: FORD GLOBAL TECHNOLOGIES, LLC, Dearborn, MI (US)

(72) Inventor: William Paul Perkins, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 622 days.

(21) Appl. No.: 14/606,103

(22) Filed: Jan. 27, 2015

(65) Prior Publication Data

US 2016/0214502 A1 Jul. 28, 2016

(51) Int. Cl.
H02J 7/00 (2006.01)
B60L 11/18 (2006.01)
H01M 10/44 (2006.01)

(52) U.S. Cl.
CPC ....... *B60L 11/1874* (2013.01); *H01M 10/443* (2013.01); *H02J 7/0021* (2013.01); *H02J 7/0029* (2013.01); *H02J 7/0047* (2013.01); *H02J 7/0068* (2013.01); *H02J 7/0083* (2013.01); *H01M 2220/20* (2013.01); *Y02T 10/7055* (2013.01)

(58) Field of Classification Search
CPC .................................................. H02J 7/0031
USPC ......................................................... 320/134
See application file for complete search history.

(56) References Cited

U.S. PATENT DOCUMENTS

| 5,739,650 | A | * | 4/1998 | Kimura | H02P 6/08 318/400.07 |
|---|---|---|---|---|---|
| 7,196,493 | B2 | | 3/2007 | McGee et al. | |
| 8,203,314 | B2 | | 6/2012 | Odaohhara | |
| 8,616,312 | B2 | | 12/2013 | Connolly et al. | |
| 8,624,559 | B2 | | 1/2014 | Syed et al. | |
| 2009/0139781 | A1 | | 6/2009 | Straubel | |
| 2009/0140697 | A1 | * | 6/2009 | Hurley | H02J 7/0091 320/139 |
| 2012/0091971 | A1 | * | 4/2012 | Syed | B60L 11/1851 320/162 |
| 2013/0271148 | A1 | | 10/2013 | Maeda | |
| 2016/0011269 | A1 | * | 1/2016 | Wang | G01R 31/3651 702/63 |

FOREIGN PATENT DOCUMENTS

JP 5378023 B2 12/2013

* cited by examiner

*Primary Examiner* — Suresh Memula
(74) *Attorney, Agent, or Firm* — Carlson, Gaskey & Olds, P.C.

(57) ABSTRACT

A method according to an exemplary aspect of the present disclosure includes, among other things, monitoring a root mean square (RMS) current of a component for a time window, and adjusting a flow of current relative to a battery such that a slope of the RMS current gradually approaches zero as the RMS current approaches an RMS current limit for the time window.

19 Claims, 4 Drawing Sheets

SYSTEM AND METHOD FOR BATTERY CONTROL USING RMS CURRENT

BACKGROUND

Electrified vehicles, such as hybrid electric vehicles (HEVs), use electric machines instead of, or in addition to, an internal combustion engine. Electrified vehicles are typically equipped with a battery pack containing multiple battery cells that store electrical power for powering an electric machine. During operation of the engine, the battery cells generate heat. Thus, some battery packs include a thermal management system that uses fluid, such as liquid or air, to cool the cells. The battery packs also include other components that generate heat, such as wire harnesses, connectors, and cables (as examples). These components are typically not cooled, however.

SUMMARY

A method according to an exemplary aspect of the present disclosure includes, among other things, monitoring a root mean square (RMS) current of a component for a time window, and adjusting a flow of current relative to a battery such that a slope of the RMS current gradually approaches zero as the RMS current approaches an RMS current limit for the time window.

In a further embodiment of the foregoing method, the amount of current flowing relative to the battery is controlled such that the slope of the RMS current, relative to the RMS current, is limited by an established decay line.

In a further embodiment of the foregoing method, the decay line initially has an increasingly negative slope.

In a further embodiment of the foregoing method, the decay line has an inflection point prior to the RMS current reaching the RMS current limit.

In a further embodiment of the foregoing method, the slope of the decay line gradually approaches zero as the decay line converges on a point having a value of zero average RMS current slope at the RMS current limit.

In a further embodiment of the foregoing method, the RMS current limit for the time window is an established value.

In a further embodiment of the foregoing method, the method further includes monitoring RMS current of the component for a plurality of time windows, each of the plurality of time windows having an RMS current limit.

In a further embodiment of the foregoing method, the plurality of time windows includes five time windows.

In a further embodiment of the foregoing method, the five time windows are 300, 600, 1200, 1800, and 3600 seconds.

In a further embodiment of the foregoing method, the method includes estimating the temperature of the component using the RMS current.

In a further embodiment of the foregoing method, the RMS current limit corresponds to an unacceptably high operating temperature for the component.

In a further embodiment of the foregoing method, the RMS current limit is adjusted based on ambient temperature.

In a further embodiment of the foregoing method, wherein the step of monitoring the RMS current includes applying a filter to a calculated RMS current to smooth the calculated RMS current.

A method according to another exemplary aspect of the present disclosure includes, among other things, monitoring a root mean square (RMS) current of a component for a plurality of time windows. Each of the time windows has an RMS current limit. Further, the method includes adjusting a flow of current relative to a battery when an RMS current for any one of the time windows approaches a respective RMS current limit.

In a further embodiment of the foregoing method, the plurality of time windows include at least five time windows.

In a further embodiment of the foregoing method, the current flow relative to the battery is adjusted such that a slope of the RMS current for a particular time window gradually approaches zero as the RMS current approaches a respective one of the RMS current limits.

A system according to an exemplary aspect of the present disclosure includes, among other things, a battery, a component associated with the battery, and a control system. The control system is configured to monitor a root mean square (RMS) current of the component for a time window. The control system is further configured to adjust flow of current relative to a battery such that a slope of the RMS current gradually approaches zero as the RMS current approaches an RMS current limit for the time window.

In a further embodiment of the foregoing system, the amount of current flowing relative to the battery is controlled such that the slope of the RMS current, relative to the present value of RMS current, is limited by an established decay line.

In a further embodiment of the foregoing system, the slope of the decay line gradually approaches zero as the decay line converges on a point having a value of zero average RMS current slope at the RMS current limit.

In a further embodiment of the foregoing system, the control system monitors an RMS current of the component for a plurality of time windows, each of the plurality of time windows having an established RMS current limit.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

This disclosure relates to a system and method for battery control using the RMS (root mean square) current of one or more electrical components. Example components include wire harnesses, connectors, and high voltage cables, as examples. The RMS current of these components is used (together with ambient, external vehicle temperature in some examples) to estimate the temperature of the components. As the RMS current approaches a particular limit, the power or current drawn from, or put into, the battery is reduced to maintain or reduce the temperature of the components.

Figure 1:
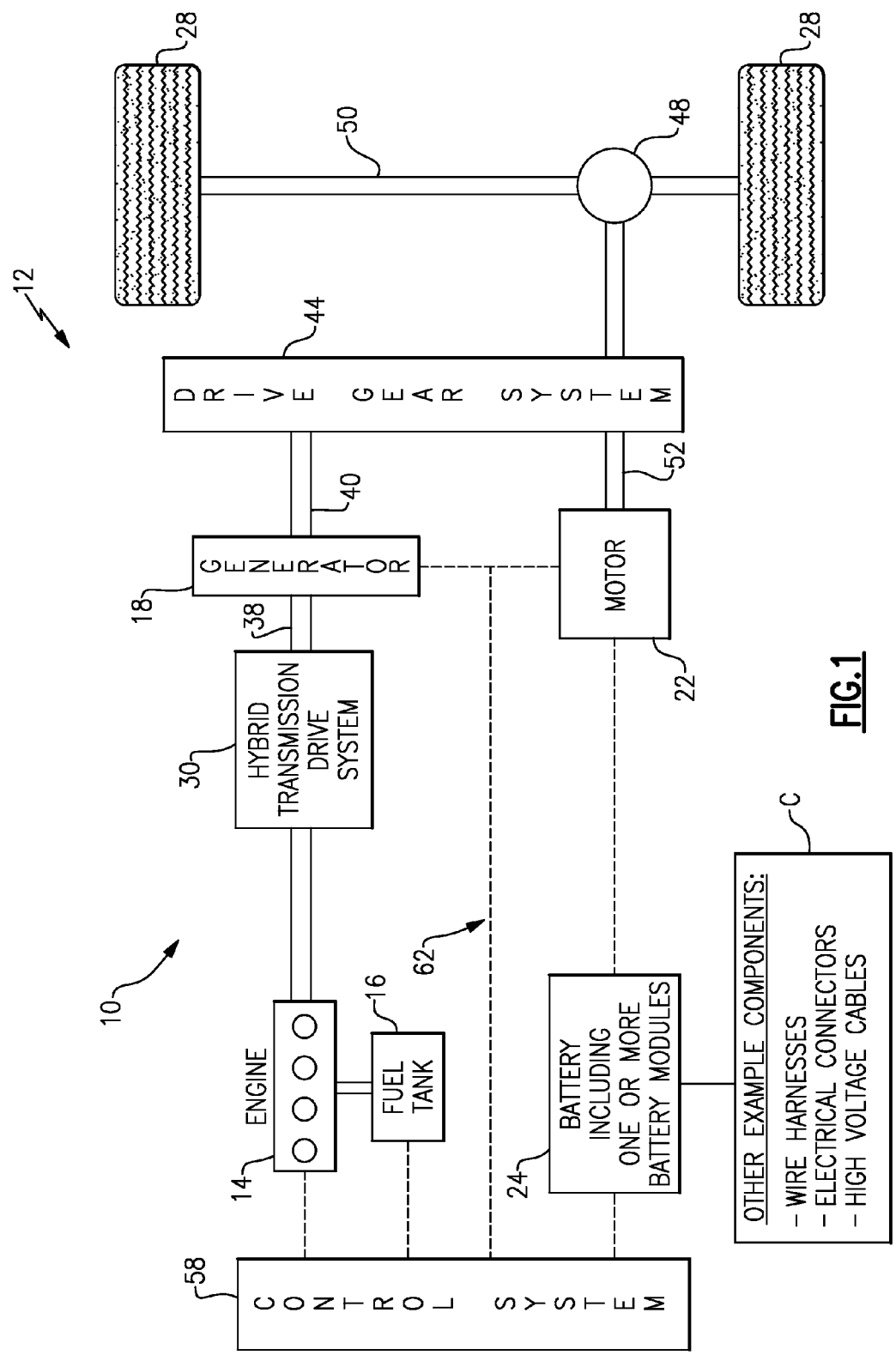
FIG. 1 schematically illustrates a powertrain of a vehicle.

FIG. 1 schematically illustrates a powertrain of a vehicle 12, which, in this example, is an electrified vehicle. Although depicted as a powertrain for a hybrid electric vehicle (HEV), it should be understood that the concepts described herein are not limited to HEVs and could extend to other vehicles, including, but not limited to, plug-in hybrid electric vehicles (PHEVs), battery electric vehicles (BEVs), and modular hybrid transmission vehicles. Further, this disclosure extends to other types of battery assemblies and is not limited to those associated with vehicles.

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery 24. In this embodiment, the second drive system is considered an electric drive system of the powertrain 10. The first and second drive systems generate torque to drive one or more sets of vehicle drive wheels 28 of the vehicle 12.

The engine 14, which is an internal combustion engine (ICE) in this embodiment, receives fuel, such as gasoline, from a fuel tank 16. Depending on the type of vehicle, fuels other than gasoline may be used. The engine 14 and the generator 18 may be connected through a power transfer unit 30, which in this example is a hybrid transmission gear system, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear, a sun gear, and a carrier assembly.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The power transfer unit 30 may be connected to a shaft 40, which is connected to vehicle drive wheels 28 through a second power transfer unit 44, which in this example is a drive gear system. The second power transfer unit 44 may include a gear set having a plurality of gears. Other power transfer units may also be suitable. The second power transfer unit 44 transfers torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery 24.

The battery 24 is one exemplary type of an electrified vehicle battery assembly and may take the form of a high voltage battery that is capable of outputting electrical power to operate the motor 22 and/or the generator 18. The battery 24 may include one or more battery modules connected in parallel or in series, depending on the application. The battery 24 may further include a plurality of components C such as wire harnesses, electrical connectors, and high voltage cables, as examples. Other types of energy storage devices and/or output devices can also be used to supply power within the vehicle 12.

The powertrain 10 may additionally include a control system 58 (or, "controller") for monitoring and/or controlling various aspects of the vehicle 12. For example, the control system 58 may communicate with the battery 24 and be operable to adjust the amount current flowing relative to the battery 24. In other words, the control system 58 may be operable to control the power and/or current the motor 22 draws from, and puts into, the battery 24. Further, the control system 58 is operable to simultaneously monitor the RMS current relative to the RMS limits for a plurality of time windows, as will be explained in more detail below.

The control system 58 includes electronics, software, or both, to perform the necessary control functions for operating the vehicle 12. In one non-limiting embodiment, the control system 58 is a combination vehicle system controller and powertrain control module (VSC/PCM). Although it is shown as a single hardware device, the control system 58 may include multiple controllers in the form of multiple hardware devices, or multiple software controllers within one or more hardware devices. A controller area network (CAN) 62 allows the control system 58 to communicate with the various components of the vehicle 12.

Figure 2:
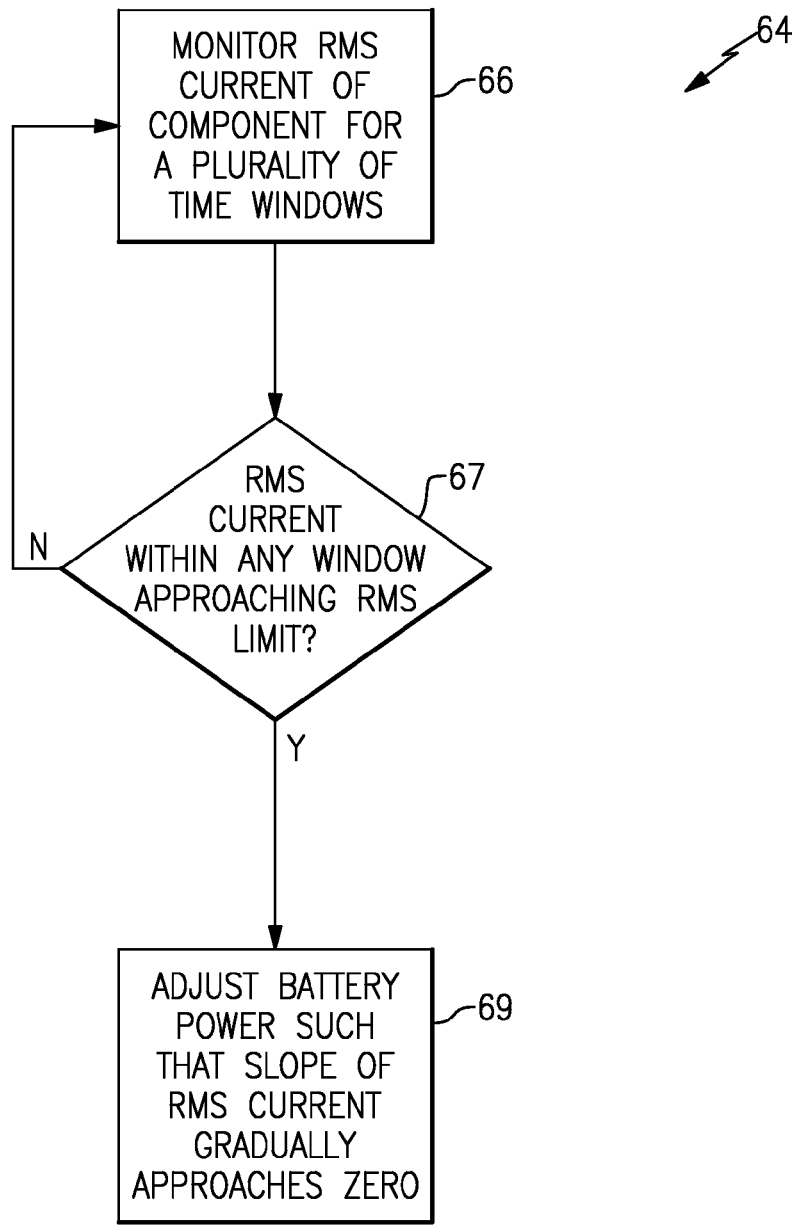
FIG. 2 illustrates an example method according to this disclosure.

FIG. 2 illustrates an example method 64 according to this disclosure. In the method 64, the RMS current of a component C of the battery 24 is monitored for one or more time windows, at 66. This disclosure may monitor multiple components C at once over multiple time windows. As mentioned above, the monitored components C may include wire harnesses, electrical connectors, and high voltage cables, as examples. This disclosure extends to other types of components that generate heat by way of current flow during operation of the battery 24.

RMS current is a value representative of the current that has flowed through a component from the present time over a past time window. RMS current of a component may be, by the control system 58, calculated as follows:

$$I_{RMS} = \sqrt{(I^2)_{avg}}$$

The "avg" indicator in the equation above represents the average of the squared, time-varying current over a particular time window. In this disclosure, one example time window is 300 seconds. Thus, the RMS current of a component at a particular point in time calculated using a time window of 300 seconds is a value representative of the current that has flowed through the component in the previous 300 seconds.

Figure 3:
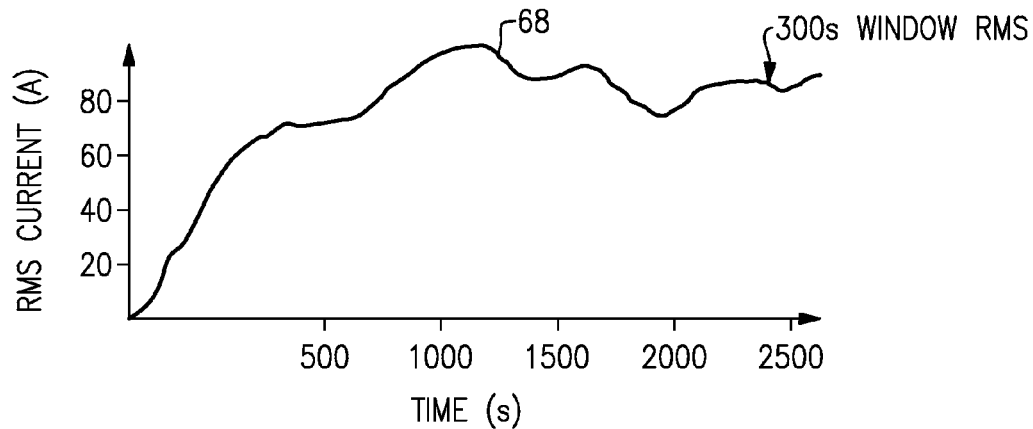
FIG. 3 graphically represents a plot of RMS current versus time for a component using a 300 second time window.

FIG. 3 graphically illustrates a plot of RMS current versus time. The vertical axis is RMS current, with units of Amps, and the horizontal axis is time in seconds. Line 68 is a plot of RMS current versus time for a particular component calculated using a 300 second time window.

As mentioned above, this disclosure uses RMS current as a basis for estimating the temperature of a component. For a particular time window, each component has a known RMS limit, which may or may not be dependent on ambient temperature (e.g., for higher ambient temperatures, a component has more difficulty dissipating heat, so a given RMS current may result in higher component temperature). In the method 64, as the RMS current of the component approaches the RMS limit, at 67, the control system 58 initiates adjustments, at 69, to the power or current drawn from, or put into, the battery 24.

Figure 4:
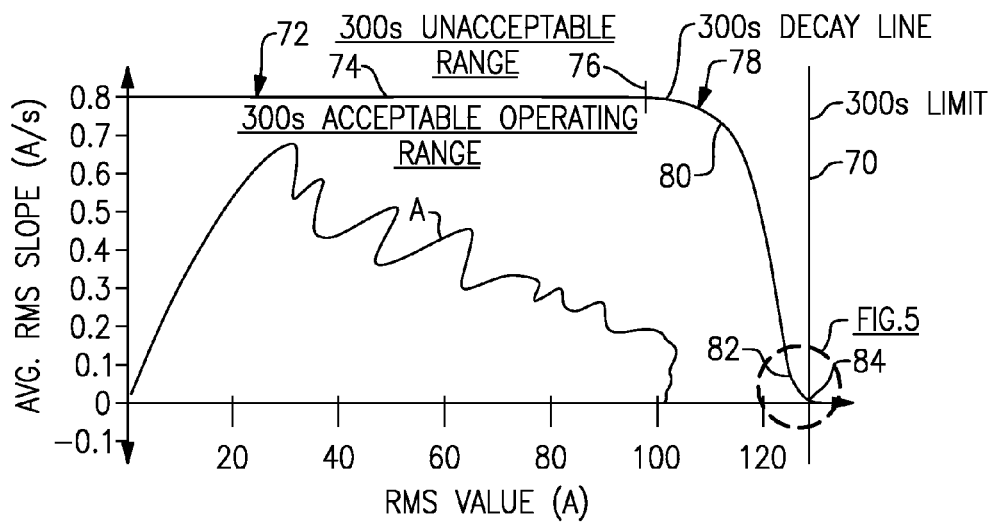
FIG. 4 graphically represents a plot of average RMS slope versus RMS value for the same component and time window as in FIG. 3.
Figure 5:
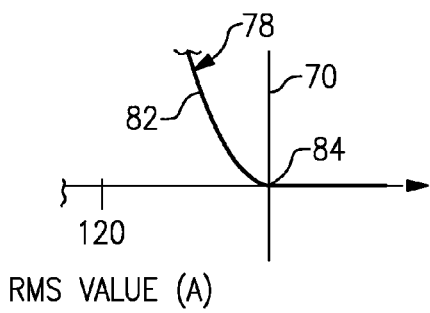
FIG. 5 is a close-up view of the encircled area of FIG. 4.

In this example, for the 300 second time window, the same component from FIG. 3 has an RMS limit of about 130 Amps. The RMS limit is illustrated in FIG. 4 at 70. Above this RMS limit 70, the temperature of the component may exceed a maximum operating temperature for the component. Above that temperature, the component may fail or operate at a substandard level.

FIG. 4 is a graphic of average RMS slope (e.g., rate of change) versus RMS value. Alternatively, the "average RMS slope" may also be referred to as a "smoothed" RMS slope. Average slopes are used in some examples because raw RMS values are too erratic to assess. The RMS values can be "smoothed" using an average or another filtering process. For instance, the filter can be a software-based filter applied to a calculated RMS current signal to filter out rapid changes in the slope of that signal, which allows for a better assessment of the slope of the RMS current. Use of the term "average" in this application is inclusive of other types of filtering processes.

Line A is a plot of the smoothed slope of the line 68 relative to RMS value. The control system 58 compares the line A to a threshold line 72 that has been established for the same component and time window of line 68 in FIG. 3. The threshold line 72 is used to control the level of power or current drawn from, or put into, the battery 24 when the RMS current of the component indicates that there may be a temperature problem.

In FIG. 4, the area above the threshold line 72 indicates an unacceptable range for operation (e.g., when operating above the threshold line 72, the temperature of the component may be above a maximum rated operating temperature).

The threshold line 72 includes a constant segment 74 from zero RMS current to a decay threshold 76. Between zero RMS current and the decay threshold 76, the constant segment is at about 0.8 A/s in this example. Beyond the decay threshold 76, the threshold line 72 begins to follow a decay line 78.

In this example, the decay line 78 smoothly and gradually approaches zero average RMS slope as the RMS current values approach the RMS limit 70. In this example, the decay line has a first portion 80 that has an increasingly negative slope similar to that of a second degree polynomial (e.g., such as $-x^2$). At a point before reaching zero average RMS slope, however, the decay line 78 includes an inflection point 82, such that the slope of the decay line 78 approaches zero as the decay line 78 converges on a point 84 having a value of zero average RMS slope at the RMS limit 70. Together with the inflection point 82, the decay line 78 somewhat resembles a third degree polynomial (e.g., $-x^3$). In general, the decay line 78 may resemble a "smooth-compact" decay function $$\text{(e.g., } \exp\left(k - \frac{k}{1 - \left(\frac{x}{L}\right)^2}\right)\text{)}$$

where k is a constant, L is RMS current limit (e.g. FIG. 4 item 70), and x is RMS current at beginning of decay line (e.g., FIG. 4 item 76).

By defining the decay line 78 such that it smoothly and gradually approaches a slope of zero as the decay line 78 converges on point 84, undesirable vehicle behaviors, such as rapid changes in engine operation affecting noise and vibration, are avoided. Essentially, the decay line 78 allows for a smooth transition away from full battery capabilities without any pronounced disturbances that would be noticeable to a driver or passenger.

As mentioned, FIG. 4 includes line A, which is representative of a plot of RMS slope versus RMS value for the line 68 in FIG. 3. In this instance, line A did not approach the threshold line 72. If it did, however, the current flowing relative to the battery 24 (e.g., the power or current drawn from, or put into, the battery 24) would be reduced by the control system 58, which would in turn reduce the RMS current of the component, and ultimately reduce the temperature of the component.

While FIGS. 3 and 4 illustrate the RMS current for a particular component calculated using a 300 second time window, additional windows may be used and, indeed, may be useful for providing a more complete picture of the current flowing through the particular component. Again, a 300 second window only considers the prior 300 seconds from a particular point in time. This relatively short window provides an accurate picture of the current flowing through the component in the short term. However, monitoring the current flowing through the component over the long term may also be beneficial. Thus, in one example of this disclosure, a plurality of windows of time are considered in parallel.

Figure 6:
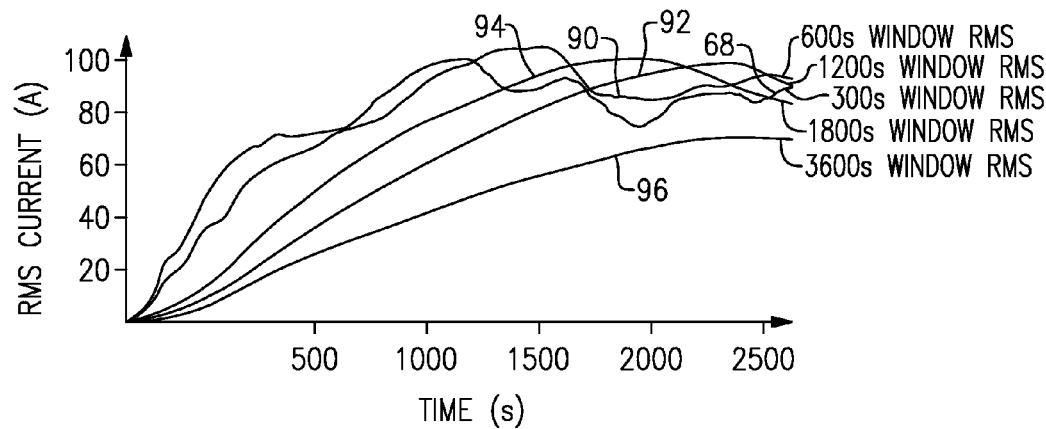
FIG. 6 is a plot of RMS current versus time for a component using five separate time windows of 300, 600, 1200, 1800, and 3600 seconds.

In one example, the RMS current associated with five separate windows is monitored, in parallel, for a given component. As illustrated in FIG. 6, line 68 is the same line 68 from FIG. 3 representing a plot of the RMS current versus time for a particular component using a 300 second time window. Lines 90, 92, 94, and 96 are plots of RMS current versus time for the same component calculated using 600, 1200, 1800, and 3600 second windows, respectively. While five windows are specifically discussed herein, this disclosure extends to different numbers of time windows. Further, while 300, 600, 1200, 1800, and 3600 second windows are mentioned herein, this disclosure extends to windows of other durations.

Figure 7:
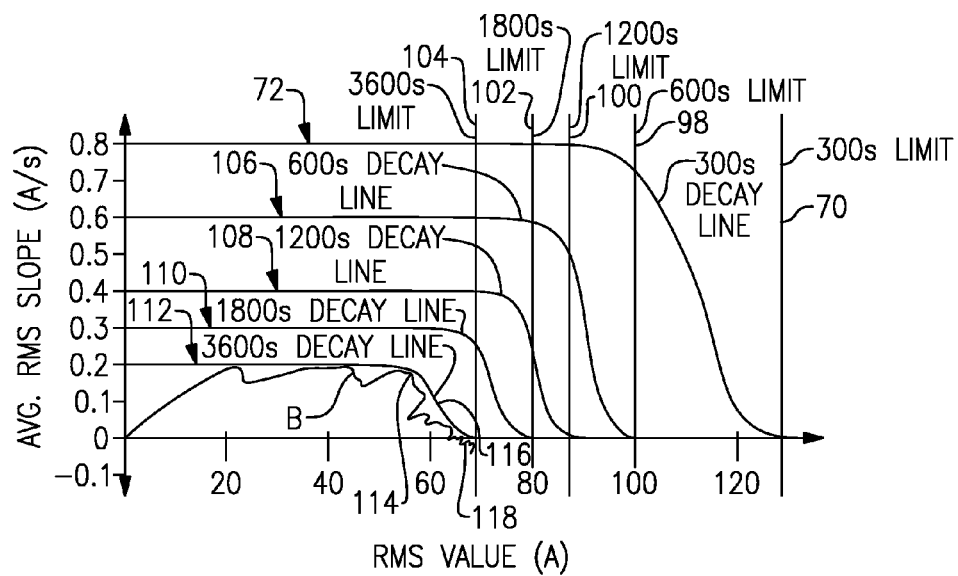
FIG. 7 graphically represents plots of average RMS slope versus RMS value for the 300, 600, 1200, 1800, and 3600 second time windows of FIG. 6.

As shown in FIG. 7, there are established RMS limits 98, 100, 102, 104 associated with these 600, 1200, 1800, and 3600 second windows, respectively. Relative to the RMS limit 70 for the 300 second window, limits 98, 100, 102, 104 associated with the longer windows are successively smaller. This is due to the ability of a component to handle relatively large currents over a short period of time, while being more drastically affected by relatively lower currents when experienced over a prolonged period.

Each of the windows is further associated with a threshold line 106, 108, 110, and 112 for the 600, 1200, 1800, and 3600 second windows, respectively. These threshold lines 106, 108, 110, 112 are the same in shape as that of the threshold line 72 discussed relative to FIG. 4, although they are essentially scaled down. For example, the constant segments of the threshold lines 106, 108, 110, 112 are successively smaller (e.g., lower values of average RMS slope), and are each smaller than the constant segment 74. Each threshold line 106, 108, 110, 112 includes a decay line that smoothly and gradually approaches a slope of zero as the respective threshold line converges on a point having a value of zero average RMS slope at a respective RMS limit (in the same way as discussed above relative to the decay line 78).

Whereas line A in FIG. 4 did not approach the threshold line 72, FIG. 7 illustrates a line B calculated using a 3600 second time window. As illustrated in FIG. 7, the line B, at point 114, has approached the decay line 116 portion of the threshold line 112. Thus, at 67, the control system 58 adjusts the power or current drawn from, or put into, the battery 24 to ensure that the RMS current associated with the component does not go beyond the threshold line 112. Further, in this example, at point 118 the control system 58 has instructed the motor 22 to no longer draw any power from, or send any power to, the battery 24 altogether. Doing so avoids exceeding the RMS limit 104 associated with the 3600 second window.

When making this adjustment, the RMS currents associated with other time windows (e.g., 300, 600, 1200, and 1800 seconds) may not indicate any temperature problem. Thus, in this example, the problem was only able to be identified by considering multiple time windows in parallel.

This disclosure provides a system that is relatively easily implemented—and in fact may be implemented using existing components. In particular, this disclosure is also beneficial in that the temperature of the monitored components is not easily detected using temperature sensors. Further, this disclosure avoids poor vehicle behavior that may be caused by a sudden battery shutoff or rapid reduction in battery capability. Instead, the smooth, gradual decay line allows for substantially uninterrupted driving while protecting the vehicle's electrical components.

Although the different examples have the specific components shown in the illustrations, embodiments of this disclosure are not limited to those particular combinations. It is possible to use some of the components or features from one of the examples in combination with features or components from another one of the examples. For instance, while this disclosure has specifically referenced the battery 24 of a vehicle as one specific application, this disclosure could be used in other electrical systems, such as air conditioning systems. This disclosure is not limited to the battery 24 and its components.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A method, comprising:
monitoring a root mean square (RMS) current of a component for a time window; and
adjusting a flow of current relative to a battery such that a slope of the RMS current gradually approaches zero as the RMS current approaches an RMS current limit for the time window.

2. The method as recited in claim 1, wherein the amount of current flowing relative to the battery is controlled such that the slope of the RMS current, relative to the RMS current, is limited by an established decay line.

3. The method as recited in claim 2, wherein the decay line initially has an increasingly negative slope.

4. The method as recited in claim 3, wherein the decay line has an inflection point prior to the RMS current reaching the RMS current limit.

5. The method as recited in claim 4, wherein the slope of the decay line gradually approaches zero as the decay line converges on a point having a value of zero average RMS current slope at the RMS current limit.

6. The method as recited in claim 1, wherein the RMS current limit for the time window is an established value.

7. The method as recited in claim 1, further comprising:
monitoring RMS current of the component for a plurality of time windows, each of the plurality of time windows having an RMS current limit.

8. The method as recited in claim 7, wherein the plurality of time windows includes five time windows.

9. The method as recited in claim 8, wherein the five time windows are 300, 600, 1200, 1800, and 3600 seconds.

10. The method as recited in claim 1, further comprising:
estimating the temperature of the component using the RMS current.

11. The method as recited in claim 10, wherein the RMS current limit corresponds to an unacceptably high operating temperature for the component.

12. The method as recited in claim 11, wherein the RMS current limit is adjusted based on ambient temperature.

13. The method as recited in claim 1, wherein the step of monitoring the RMS current includes applying a filter to a calculated RMS current to smooth the calculated RMS current.

14. A method, comprising:
monitoring a root mean square (RMS) current of a component for a plurality of time windows, each of the time windows having an RMS current limit; and
adjusting a flow of current relative to a battery when an RMS current for any one of the time windows approaches a respective RMS current limit, wherein the current flow relative to the battery is adjusted such that a slope of the RMS current for a particular time window gradually approaches zero as the RMS current approaches a respective one of the RMS current limits.

15. The method as recited in claim 14, wherein the plurality of time windows include at least five time windows.

16. A system, comprising:
a battery;
a component associated with the battery; and
a control system configured to monitor a root mean square (RMS) current of the component for a time window, the control system further configured to adjust a flow of current relative to a battery such that a slope of the RMS current gradually approaches zero as the RMS current approaches an RMS current limit for the time window.

17. The system as recited in claim 16, wherein the amount of current flowing relative to the battery is controlled such that the slope of the RMS current, relative to the present value of RMS current, is limited by an established decay line.

18. The system as recited in claim 17, wherein the slope of the decay line gradually approaches zero as the decay line converges on a point having a value of zero average RMS current slope at the RMS current limit.

19. The system as recited in claim 16, wherein the control system monitors an RMS current of the component for a plurality of time windows, each of the plurality of time windows having an established RMS current limit.

* * * * *